(12) United States Patent
Yamada et al.

(10) Patent No.: US 7,923,174 B2
(45) Date of Patent: *Apr. 12, 2011

(54) HOLOGRAPHIC RECORDING COMPOSITION AND HOLOGRAPHIC RECORDING MEDIUM

(75) Inventors: Satoru Yamada, Kanagawa (JP); Makoto Kamo, Kanagawa (JP); Toshio Sasaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 363 days.

This patent is subject to a terminal disclaimer.

(21) Appl. No.: 12/061,954

(22) Filed: Apr. 3, 2008

(65) Prior Publication Data
US 2008/0254374 A1    Oct. 16, 2008

(30) Foreign Application Priority Data
Apr. 10, 2007    (JP) .................... 2007-102874

(51) Int. Cl.
*G03H 1/02*    (2006.01)
(52) U.S. Cl. .............. 430/2; 430/281.1; 359/3
(58) Field of Classification Search .......... None
See application file for complete search history.

(56) References Cited

U.S. PATENT DOCUMENTS

| | | | | |
|---|---|---|---|---|
| 3,769,244 | A * | 10/1973 | Hashimoto et al. | 521/129 |
| 4,631,206 | A * | 12/1986 | Mabuchi et al. | 427/340 |
| 6,482,551 | B1 * | 11/2002 | Dhar et al. | 430/1 |
| 2002/0114027 | A1 | 8/2002 | Horimai | |
| 2003/0044691 | A1 * | 3/2003 | Setthachayanon et al. | 430/1 |
| 2005/0068593 | A1 * | 3/2005 | Hayase et al. | 359/1 |
| 2006/0115740 | A1 * | 6/2006 | Hayase et al. | 430/1 |
| 2007/0072124 | A1 * | 3/2007 | Yamada | 430/270.11 |
| 2007/0242323 | A1 * | 10/2007 | Yamada | 359/3 |

FOREIGN PATENT DOCUMENTS

| | | |
|---|---|---|
| JP | 11-311936 A | 11/1999 |
| JP | 2005-502918 A | 1/2005 |
| JP | 2007-272037 | * 10/2007 |
| WO | WO 03/023519 A1 | 3/2003 |

OTHER PUBLICATIONS

Mayer et al., "Amminium von a-ketocarbonsauren, einer Klass neuer Photoiniaitoren", Angew. Chem. vol. 93 pp. 83-95 (1981).*
Extended European Search Report dated May 18, 2010 on corresponding EP Application No. 08006995.8.

* cited by examiner

*Primary Examiner* — Martin J Angebrannt
(74) *Attorney, Agent, or Firm* — Sughrue Mion, PLLC

(57) ABSTRACT

The present invention provides a holographic recording composition and a holographic recording medium comprising a recording layer formed with the holographic recording composition. The holographic recording composition comprises a bifunctional or greater isocyanate, a polyfunctional alcohol comprising a bifunctional alcohol and a trifunctional or greater alcohol, a titanocene-based radical polymerization initiator, a bifunctional or greater acrylate monomer, and an amidine salt denoted by General Formula (1).

General Formula (1)

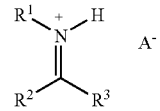

In General Formula (1), $R^1$, $R^2$, and $R^3$ each independently denote an alkyl group, aryl group, amino group, or acyl group, $R^1$ and $R^2$ may be bonded together to form a ring, $R^2$ and $R^3$ may be bonded together to form a ring, and $A^-$ denotes an anion.

7 Claims, 4 Drawing Sheets

HOLOGRAPHIC RECORDING COMPOSITION AND HOLOGRAPHIC RECORDING MEDIUM

CROSS-REFERENCE TO RELATED APPLICATIONS

This application claims the benefit of priority under 35 USC 119 to Japanese Patent Application No. 2007-102874 filed on Apr. 10, 2007, which is expressly incorporated herein by reference in its entirety.

BACKGROUND OF THE INVENTION

1. Field of the Invention

The present invention relates to a holographic recording composition suited to the manufacturing of a holographic recording medium, and more particularly, a volume holographic recording medium. The present invention further relates to a holographic recording medium formed with the above holographic recording composition.

2. Discussion of the Background

Holographic optical recording media based on the principle of the holograph have been developed. Recording of information on holographic optical recording media is carried out by superposing an informing light containing image information and a reference light in a recording layer comprised of a photosensitive composition to write an interference fringe thus formed in the recording layer. During the reproduction of information, a reference light is directed at a prescribed angle into the recording layer in which the information has been recorded, causing optical diffraction of the reference light by the interference fringe which has been formed, reproducing the informing light. For example, Published Japanese Translation of a PCT International Application (TOKUHYO) No. 2005-502918 or English language family member WO 03/023519, which are expressly incorporated herein by reference in their entirety, disclose the use of a urethane matrix and a phenyl acrylate derivative in a holographic optical recording medium of the photopolymer type.

In recent years, volume holography, and, more particularly, digital volume holography, have been developed to practical levels for ultrahigh-density optical recording and have been garnering attention. Volume holography is a method of writing interference fringes three-dimensionally by also actively utilizing the direction of thickness of an optical recording medium. It is advantageous in that increasing the thickness permits greater diffraction efficiency and multiplexed recording increases the recording capacity. Digital volume holography is a computer-oriented holographic recording method in which the image data being recorded are limited to a binary digital pattern while employing a recording medium and recording system similar to those of volume holography. In digital volume holography, for example, image information such as an analog drawing is first digitized and then expanded into two-dimensional digital pattern information, which is recorded as image information. During reproduction, the digital pattern information is read and decoded to restore the original image information, which is displayed. Thus, even when the signal-to-noise (S/N) ratio deteriorates somewhat during reproduction, by conducting differential detection or conducting error correction by encoding the two-dimensional data, it is possible to reproduce the original data in an extremely faithful manner (see Japanese Unexamined Patent Publication (KOKAI) Heisei No. 11-311936 or English language family member US 2002/0114027 A1, which are expressly incorporated herein by reference in their entirety).

The above-mentioned volume photographic optical recording medium is an attempt to increase sensitivity. However, the sensitivity of conventional holographic recording media, including that of the holographic recording medium described in Published Japanese Translation of a PCT International Application (TOKUHYO) No. 2005-502918, is not necessarily adequate for volume holographic recording and requires further improvement.

In photopolymer-type holographic optical recording media such as the holographic recording medium described in Published Japanese Translation of a PCT International Application (TOKUHYO) No. 2005-202918, a signal beam and an interference beam are generally irradiated to cause polymerization of a recording monomer, thereby forming an interference image in the recording layer. A fixing beam is then directed onto the recording layer in which the interference image has been formed to fix the interference image. When the recording monomer and radical polymerization initiator remain in large quantities at the completion of the steps of forming and fixing the interference image (the recording reaction), the polymerization reaction progresses further when the recording medium in which the interference image has been formed is exposed to bright light, creating a problem in that the recording is damaged and archiving properties (recording retention) deteriorate. Thus, at the end of the recording reaction, it is desirable for only small quantities of polymerization reaction components in the form of the recording monomer and radical polymerization initiator to remain. The designing of such a system is desirable.

SUMMARY OF THE INVENTION

An aspect of the present invention provides for a holographic recording composition that is suited to digital volume holography and affords high sensitivity, a low ratio of residual recording monomer remaining at the end of the reaction, and good archiving properties; and to provide a holographic recording medium permitting ultrahigh-density optical recording using the above holographic recording composition.

As the result of extensive research, the present inventors discovered that by incorporating bifunctional or greater acrylate monomers together with a prescribed amidine salt and a titanocene-based radical polymerization initiator in a holographic recording composition, it was possible to markedly reduce the quantity of monomer remaining after the recording reaction and thus improve archiving properties; and that by employing a polyurethane matrix formed by a bifunctional or greater isocyanate, a bifunctional alcohol, and a trifunctional or greater alcohol to maintain the above-described polymerization initiator and monomer related to information recording and storage, it was possible to markedly improve sensitivity. The present invention was devised on that basis.

An aspect of the present invention relates to a holographic recording composition comprising a bifunctional or greater isocyanate, a polyfunctional alcohol comprising a bifunctional alcohol and a trifunctional or greater alcohol, a titanocene-based radical polymerization initiator, a bifunctional or greater acrylate monomer, and an amidine salt denoted by General Formula (1).

General Formula (1)

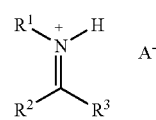

In General Formula (1), $R^1$, $R^2$, and $R^3$ each independently denote an alkyl group, aryl group, amino group, or acyl group, $R^1$ and $R^2$ may be bonded together to form a ring, $R^2$ and $R^3$ may be bonded together to form a ring, and $A^-$ denotes an anion.

The amidine salt may be DBU phenol salt, DBN carboxylic acid salt, or DBN phenol acid salt.

The bifunctional alcohol may comprise polyethylene glycol.

The bifunctional alcohol may comprise polypropylene glycol.

The trifunctional or greater alcohol may comprise polypropylene oxide triol.

A polyurethane matrix formed through a curing reaction between the bifunctional or greater isocyanate and the polyfunctional alcohol may have a crosslinking point density ranging from 0.9 to 1.2 mmole/g.

A further aspect of the present invention relates to a holographic recording medium comprising a recording layer, wherein the recording layer is formed with the above holographic recording composition.

The present invention can provide a holographic recording composition suited to digital volume holography that affords high sensitivity and good archiving properties, and a holographic recording medium permitting ultrahigh-density optical recording employing the above holographic recording composition.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the figures, wherein.

Figure 1:
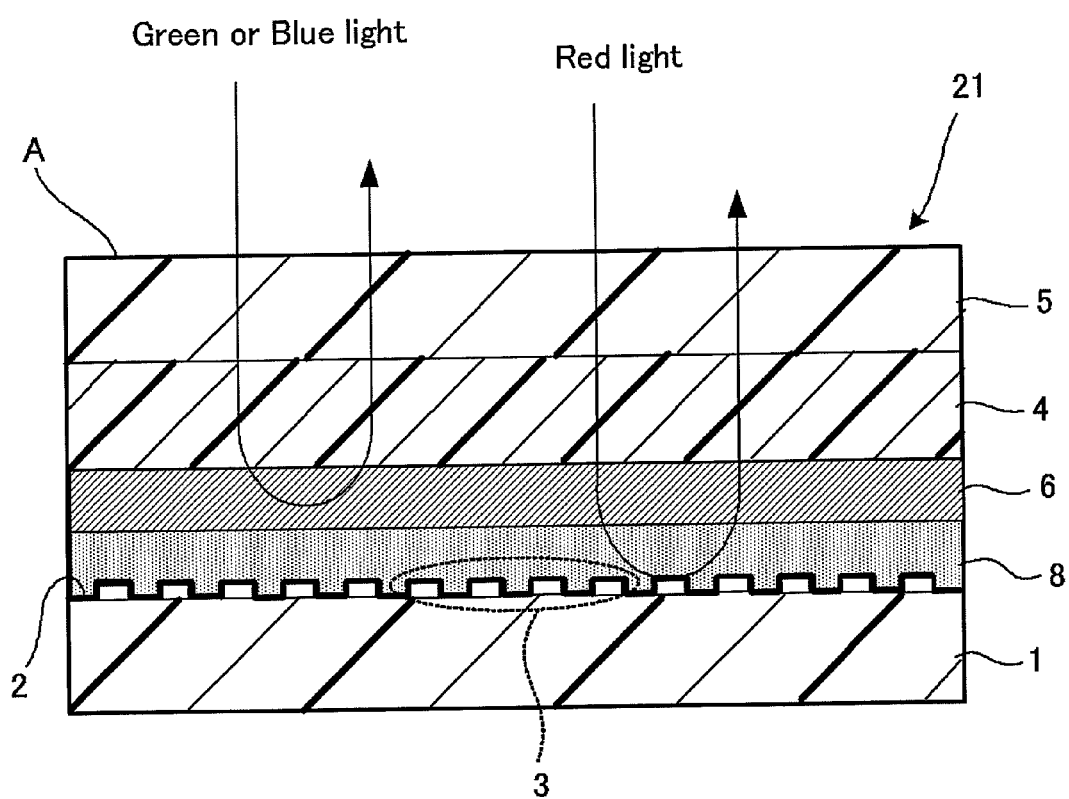
FIG. 1 is a schematic cross-sectional view of an example of a holographic recording medium according to a first implementation embodiment.

Explanations of symbols in the drawings are as follows:
1 Lower substrate
2 Reflective film
3 Servo pit pattern
4 Recording layer
5 Upper substrate
6 Filter layer
7 Second gap layer
8 First gap layer
12 Objective lens
13 Dichroic mirror
14 Detector
15 ¼ wavelength plate
16 Polarizing plate
17 Half mirror
20 Holographic recording medium
21 Holographic recording medium
22 Holographic recording medium
31 Pickup
81 Spindle
82 Spindle motor
83 Spindle servo circuit
84 Driving device
85 Detection circuit
86 Focus servo circuit
87 Tracking servo circuit
88 Slide servo circuit
89 Signal processing circuit
90 Controller
91 Operation element
100 Optical recording and reproducing device
A Entry and exit surface
FE Focus error signal
TE Tracking error signal
RF Reproduction signal

DESCRIPTIONS OF THE EMBODIMENTS

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Holographic Recording Composition

The holographic recording composition of the present invention comprises a bifunctional or greater isocyanate, a polyfunctional alcohol comprising a bifunctional alcohol and a trifunctional or greater alcohol, a titanocene-based radical polymerization initiator, a bifunctional or greater acrylate monomer, and an amidine salt denoted by General Formula (1).

The holographic recording composition of the present invention is suitable as a volume holographic recording composition. As set forth above, holographic recording is a method of recording information by superposing an informing light containing information and a reference light in a recording layer to write an interference fringe thus formed in the recording layer. Volume holographic recording is a method of recording information in holographic recording in which a three-dimensional interference image is written in the recording layer.

The individual components comprised in the holographic recording composition of the present invention will be described below.

The holographic recording composition of the present invention comprises a bifunctional or greater acrylate monomer together with a prescribed amidine salt and a titanocene-based radical polymerization initiator, thereby markedly reducing the quantity of residual monomer after the recording reaction and enhancing archiving properties.

A polymer (matrix) for holding monomers and polymerization initiators relating to the recording and storage of information are generally incorporated into the holographic recording medium. The holographic recording composition of the present invention comprises components, for forming a matrix to maintain the above radical polymerization initiator and acrylate monomer, in the form of a bifunctional or greater isocyanate (referred to as "polyfunctional isocyanate", hereinafter) and a polyfunctional alcohol comprising a bifunctional alcohol and a trifunctional or greater alcohol. The polyurethane matrix formed by the polymerization reaction of the above isocyanate and alcohols can maintain the titanocene-based radical polymerization initiator and bifunctional or greater acrylate monomer and thus sensitivity and archiving properties can be markedly improved. Each of the above-mentioned components will be described below.

Polyfunctional Isocyanate

It suffices for the above polyfunctional isocyanate to be bifunctional or greater; bifunctional to tetrafunctional isocyanates are preferable.

Specific examples of the polyfunctional isocyanates are: biscyclohexylmethane diisocyanate, hexamethylene diisocyanate, phenylene-1,3-diisocyanate, phenylene-1,4-diisocyanate, 1-methoxyphenylene-2,4-diisocyanate, 1-methylphenylene-2,4-diisocyanate, 2,4-tolylene diisocyanate, 2,6-tolylene diisocyanate, 1,3-xylylene diisocyanate, 1,4-xylylene diisocyanate, biphenylene-4,4'-diisocyanate, 3,3'-dimethoxybipheneylene-4,4'-diisocyanate, 3,3'-dimethylbiphenylene-4,4'-diisocyanate, diphenylmethane-2,4'-diisocyanate, diphenylmethane-4,4'-diisocyanate, 3,3'-dimethoxydiphenylmethane-4,4'-diisocyanate, 3,3'-dimethyldiphenylmethane-4,4'-diisocyanate, naphthylene-1,5-diisocyanate, cyclobutylene-1,3-diisocyanate, cyclopentylene-1,3-diisocyanate, cyclohexylene-1,3-diisocyanate, cyclohexylene-1,4-diisocyanate, 1-methylcyclohexylene-2,4-diisocyanate, 1-methylcyclohexylene-2,6-diisocyanate, 1-isocyanate-3,3,5-trimethyl-5-isocyanate methylcyclohexane, cyclohexane-1,3-bis(methylisocyanate), cyclohexane-1,4-bis(methylisocyanate), isophorone diisocyanate, dicyclohexylmethane-2,4'-diisocyanate, dicyclohexylmethane-4,4'-diisocyanate, ethylene diisocyanate, tetramethylene-1,4-diisocyanate, hexamethylene-1,6-diisocyanate, dodecamethylene-1,12-diisocyanate, phenyl-1,3,5-triisocyanate, diphenylmethane-2,4,4'-triisocyanate, diphenylmethane-2,5,4'-triisocyanate, triphenylmethane-2,4',4''-triisocyanate, triphenylmethane-4,4',4''-triisocyanate, diphenylmethane-2,4,2',4'-tetraisocyanate, diphenylmethane-2,5,2',5'-tetraisocyanate, cyclohexane-1,3,5-triisocyanate, cyclohexane-1,3,5-tris(methylisocyanate), 3,5-dimethylcyclohexane-1,3,5-tris(methylisocyanate), 1,3,5-trimethylcyclohexane-1,3,5-tris(methylisocyanate), dicyclohexylmethane-2,4,2'-triisocyanate, dicyclohexylmethane-2,4,4'-triisocyanate lysine isocyanate methyl ester, and prepolymers having isocyanate groups at both ends obtained by reacting stoichiometrically excess quantities of the above organic isocyanates with polyfunctional active hydrogen-containing compounds. Of these, biscyclohexylmethane diisocyanate and hexanemethylene diisocyanate are particularly preferable. These may be employed singly or in combinations of two or more. The holographic recording composition of the present invention may also incorporate monofunctional isocyanates in addition to the above polyfunctional isocyanates.

Polyfunctional Alcohol

The above polyfunctional alcohol comprises a bifunctional alcohol and a trifunctional or greater alcohol. Examples of bifunctional alcohols are glycols such as ethylene glycol, triethylene glycol, diethylene glycol, polyethylene glycol, propylene glycol, polypropylene glycol, and neopentyl glycol; diols such as butanediol, pentanediol, hexanediol, heptanediol, and tetramethylene glycol; bisphenols; and compounds where the aforementioned polyfunctional alcohols are modified by polyethyleneoxy chains and/or polypropyleneoxy chains. The molecular weight of the bifunctional alcohol preferably falls within a range of 50 to 10,000, more preferably within a range of 100 to 5,000, and still more preferably, within a range of 100 to 500. In the present invention, a molecular weight for polymer composition means a weight average molecular weight.

Examples of trifunctional and greater alcohols are glycerin, trimethylolpropane, butanetriol, pentanetriol, hexanetriol, decanetriol, other triols, and compounds in which the aforementioned polyfunctional alcohols are modified by polyethyleneoxy chains and/or polypropyleneoxy chains. These may be employed singly or in combinations of two or more. The molecular weight of the trifunctional, tetrafunctional, and greater alcohols preferably falls within a range of 50 to 10,000, more preferably a range of 100 to 5,000, and still more preferably, within a range of 100 to 500.

Of these, polyethylene glycol is optimally employed as the bifunctional alcohol and polypropylene oxide triol as the trifunctional alcohol. The weight ratio of the bifunctional alcohol and the trifunctional or greater alcohol, as bifunctional alcohol: trifunctional alcohol: trifunctional or greater alcohol, is preferably from 1:9 to 9:1, more preferably from 1:4 to 4:1, and still more preferably, from 1:2 to 2:1.

The mixing ratio of the polyfunctional alcohol and the polyfunctional isocyanate in the holographic recording composition of the present invention is not specifically limited. From the perspective of curing, it is preferably for the molar ratio of hydroxyl groups to isocyanate groups to be close to 1; a ratio of hydroxyl group:isocyanate group of 4:3 to 3:4 is preferable, of 6:5 to 5:6 is more preferable, and of 1:1 is of even greater preference.

A polymer (matrix) for holding monomers and polymerization initiators relating to the recording and storage of information are generally incorporated into a holographic recording medium. The matrix can be incorporated into the holographic recording medium for achieving enhanced coating properties, coating strength, and holographic recording characteristics.

A coating of the holographic recording composition of the present invention can be applied on a substrate, for example, and then subjected to high temperature to cause a polymerization reaction to take place between the polyfunctional isocyanate and the polyfunctional alcohol to form a polyurethane matrix. The content of polyfunctional isocyanate and polyfunctional alcohol in the holographic recording composition of the present invention preferably falls within a range of 10 to 95 weight percent, more preferably 35 to 90 weight percent, as the weight of the polyurethane matrix thus formed. A stable interference image can be obtained when this content is equal to or greater than 10 weight percent, and properties that are desirable from the viewpoint of diffraction efficiency can be obtained at equal to or less than 95 weight percent. The contents of the polyfunctional isocyanate and polyfunctional alcohol in the holographic recording composition prior to the above-described curing reaction are as follows. That of the polyfunctional isocyanate is, for example, 20 to 60 weight percent, preferably 30 to 50 weight percent, and that of the polyfunctional alcohol is, for example, 40 to 80 weight percent, preferably 50 to 70 weight percent.

In the holographic recording composition of the present invention, curing of the polyurethane matrix can be carried out with heat, or using a catalyst or the like. The crosslinking point density of the polyurethane matrix is preferably 0.9 to 1.2 mmole/g, more preferably 1.0 to 1.1 mmole/g. A crosslinking point density of equal to or greater than 0.9 mmole/g can ensure good archiving properties, and a crosslinking point density of equal to or less than 1.2 mmole/g is desirable to maintain high sensitivity in the holographic recording medium formed with the holographic recording composition of the present invention.

The crosslinking point density of the polyurethane matrix is the quantity of branch points contained per unit weight of matrix polymer formed. For example, when formed with bifunctional isocyanate and bifunctional and trifunctional alcohols, the quantity of crosslinking points is equal to the number of moles of trifunctional alcohol contained per unit weight. Accordingly, when selecting a polyfunctional isocyanate and polyfunctional alcohols, it is desirable to determine the blending quantities and the like so as to obtain a polyurethane matrix having a desirable crosslinking point density.

Amidine Salt

The holographic recording composition of the present invention comprises an amidine salt denoted by General Formula (1) below:

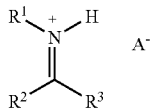

General Formula (1)

In General Formula (1), $R^1$, $R^2$, and $R^3$ each independently denote an alkyl group, aryl group, amino group, or acyl group, $R^1$ and $R^2$ may be bonded together to form a ring, $R^2$ and $R^3$ may be bonded together to form a ring, and $A^-$ denotes an anion.

General Formula (1) will be described in detail below.

In General Formula (1), the alkyl group, aryl group, amino group, and/or acyl group denoted by $R^1$, $R^2$, and $R^3$ may be such that $R^1$ and $R^2$ and/or $R^2$ and $R^3$ are bound together to form rings, it being preferable for at least $R^1$ and $R^2$, or $R^2$ and $R^3$, to form a ring structure, and more preferable for $R^1$ and $R^2$, and $R^2$ and $R^3$, to be bound together to form two ring structures.

When $R^1$ and $R^2$ and/or $R^2$ and $R^3$ are bound together to form at least one ring structure, the total number of carbon atoms contained in General Formula (1) is preferably 7 to 20, more preferably 7 to 10, and still more preferably, 7 to 9.

When $R^1$, $R^2$, and $R^3$ together form at least two ring structures between them, the total number of carbon atoms contained in General Formula (1) preferably falls within a range of 7 to 20, more preferably a range of 7 to 10, and still more preferably, a range of 7 to 9.

The alkyl group, aryl group, amino group, and acyl group denoted by $R^1$, $R^2$, and $R^3$ in General Formula (1) can be suitably selected based on the objective. Examples are optionally substituted alkyl group, optionally substituted aryl group, optionally substituted amino group, and optionally substituted acyl group. Of these, optionally substituted alkyl group and optionally substituted amino group are preferred.

In General Formula (1), at least one of the groups denoted by $R^1$, $R^2$, and $R^3$ is preferably an alkyl group, aryl group, or amino group, it being more preferable for $R^1$ to denote an alkyl group and for at least one of the groups denoted by $R^2$ and $R^3$ to denote an amino group.

The above alkyl group is not specifically limited and may be suitably selected based on the objective. The number of carbon atoms is preferably 1 to 20, more preferably 1 to 10, and still more preferably, 1 to 5.

Specific examples of the above alkyl group are a methyl group, ethyl group, normal propyl group, isopropyl group, normal butyl group, isobutyl group, tertiary butyl group, pentyl group, cyclopentyl group, hexyl group, cyclohexyl group, heptyl group, octyl group, tertiary octyl group, 2-ethylhexyl group, decyl group, dodecyl group, and octadecyl group.

The above alkyl group may be substituted. Examples of substituents that may be present on the alkyl group are a phenyl group, amino group, halogen atom, alkoxy group, aryloxy group, alkoxycarbonyl group, acyloxy group, acylamino group, carbamoyl group, cyano group, and heterocyclic group. Of these, a phenyl group and amino group are preferred, with an amino group being of even greater preference.

The above aryl group is not specifically limited and may be suitably selected based on the objective. The number of carbon atoms is preferably 6 to 20, more preferably 6 to 10, and still more preferably, 6.

Specific examples of the above aryl group are a phenyl group, tolyl group, naphthyl group, and anthranyl group.

The above aryl group may be substituted. Examples of substituents that may be present on the aryl group are an alkyl group, phenyl group, amino group, halogen atom, alkoxy group, aryloxy group, alkoxycarbonyl group, acyloxy group, acylamino group, carbamoyl group, cyano group, and heterocyclic group. Of these, an alkyl group is preferred.

In General Formula (1), the number of substituents on the aryl group is preferably equal to or fewer than 2, with 1 being preferred.

The above amino group may be unsubstituted, have a single substituent, or have two substituents. The above alkyl groups and aryl groups are desirable as substituents on the amino group. Specific examples are a methylamino group, ethylamino group, normal propylamino group, isopropylamino group, normal butylamino group, cyclohexylamino group, dimethylamino group, diethylamino group, dinormal propylamino group, diisopropylamino group, dinormal butylamino group, and dicyclohexylamino group.

The above-described alkyl groups and aryl groups are desirable as substituents on the above acyl group. Specific examples of the acyl group are an acetyl group, ethylcarbonyl group, normal propylcarbonyl group, isopropylcarbonyl group, and phenylcarbonyl group.

The anion denoted by $A^-$ in General Formula (1) is not specifically limited and can be suitably selected based on the objective. Examples are a halogen anion, carboxylate anion, sulfonate anion, and aryloxy anion. Of these, carboxylate and aryloxy anions are preferred.

The above halogen anion is not specifically limited and can be suitably selected based on the objective. Examples are a chloride anion and an iodide anion.

The above carboxylate anion is not specifically limited and can be suitably selected based on the objective. The number of carbon atoms is preferably 1 to 12, more preferably 1 to 7, and still more preferably, 1 to 6.

Specific examples of the above carboxylate anion are an acetic acid anion, trifluoroacetic acid anion, butyric acid anion, butanoic acid anion, hexanoic acid anion, octanoic acid anion, benzoic acid anion, and 4-methylbenzoic acid anion.

The above sulfonate anion is not specific limited and can be suitably selected based on the objective. The number of carbon atoms is preferably 1 to 12, more preferably 1 to 7, and still more preferably, 1 to 6.

Specific examples of the above sulfonate anion are a methanesulfonic acid anion, trifluoromethanesulfonic acid anion, ethanesulfonic acid anion, butanesulfonic acid anion, hexanesulfonic acid anion, benzenesulfonic acid anion, and toluenesulfonic acid anion.

The above aryloxy anion is not specifically limited and can be suitably selected based on the objective. The number of carbon atoms is preferably 6 to 12, more preferably 6 to 10, and still more preferably, 6 to 7.

Specific examples of the above aryloxy anion are a phenoxy anion, 4-methylphenyloxy anion, 4-methoxyphenyloxy anion, 3-chlorophenyloxy anion, and 1-hydroxynaphthalene anion.

In addition to the above halogen anions, carboxylate anions, sulfonate anions, and aryloxy anions, examples of the anion denoted by $A^-$ in General Formula (1) are a tetrafluoroborate anion, hexafluorophosphate anion, and perchloric acid anion.

Among the above anions, an acetic acid anion, trifluoroacetic acid anion, methanesulfonic acid anion, trifluoromethanesulfonic acid anion, toluenesulfonic acid anion, and phenoxy anion are preferable; an acetic acid anion, trifluoroacetic acid anion, methanesulfonic acid anion, trifluoromethanesulfonic acid anion, and phenoxy anion are more preferable; and an acetic acid anion and phenoxy anion are of still greater preference as the anion denoted by $A^-$ in General Formula (1).

The amidine salt denoted by General Formula (1) is preferably a DBU carboxylic acid salt, DBU phenol salt, DBN carboxylic acid salt, or DBN phenol salt; more preferably a DBU carboxylic acid salt or DBU phenol salt; and still more preferably, a DBU carboxylic acid salt. "DBU" denotes 1,8-diazabicyclo[5,4,0]undecene-7 and "DBN" denotes 1,5-diazabicyclo[4,3,0]-nonene-5.

Specific examples of the amidine salt (complex salt) denoted by General Formula (1) are given below.

TABLE 1

| | |
|---|---|
| $R^1\!\!\underset{R^2}{\overset{+}{\underset{\|}{N}}}\!\!\underset{R^3}{\overset{H}{\diagdown}}$ $A^-$ | |
| (structure) | $CH_3COO^-$ |
| | $CF_3COO^-$ |
| | $CH_3(CH_2)_5COO^-$ |
| | $PhCOO^-$ |
| | $CH_3C_6H_4COO^-$ |
| | $CH_3C_6H_4SO_3^-$ |
| | $CH_3SO_3^-$ |
| | $CF_3SO_3^-$ |
| | $C_6H_5O^-$ |
| | $CH_3C_6H_4O^-$ |

TABLE 2

| | |
|---|---|
| $R^1\!\!\underset{R^2}{\overset{+}{\underset{\|}{N}}}\!\!\underset{R^3}{\overset{H}{\diagdown}}$ $A^-$ | |
| (structure) | $CH_3COO^-$ |
| | $CF_3COO^-$ |
| | $CH_3(CH_2)_5COO^-$ |
| | $PhCOO^-$ |
| | $CH_3C_6H_4COO^-$ |
| | $CH_3C_6H_4SO_3^-$ |
| | $CH_3SO_3^-$ |
| | $CF_3SO_3^-$ |
| | $C_6H_5O^-$ |
| | $CH_3C_6H_4O^-$ |

TABLE 3

| | |
|---|---|
| $R^1\!\!\underset{R^2}{\overset{+}{\underset{\|}{N}}}\!\!\underset{R^3}{\overset{H}{\diagdown}}$ $A^-$ | |
| (structure) | $CH_3COO^-$ |
| | $CF_3COO^-$ |
| | $PhCOO^-$ |
| | $C_6H_5O^-$ |
| | $CH_3C_6H_5O^-$ |

The amidine salt content in the holographic recording composition of the present invention is not specifically limited and can be suitably selected based on the objective. The amidine salt content preferably falls within a range of 0.01 to 10 weight percent, more preferably within a range of 0.01 to 2 weight percent, of the total weight of the holographic recording composition. When the content is within the above range, a highly sensitive holographic recording medium can be obtained.

Radical Polymerization Initiator

The holographic recording composition of the present invention comprises a titanocene-based radical polymerization initiator. Investigation by the present inventors resulted in the novel discovery that incorporating a titanocene-based radical polymerization initiator in addition to a bifunctional or greater acrylate monomer and the above-described amidine salt permitted good progression of the polymerization reaction of the above monomer and markedly reduced the amount of residual monomer.

The titanocenes described in Japanese Unexamined Patent Publication (KOKAI) Showa No. 61-151197 and English language family member U.S. Pat. No. 4,713,401, which are expressly incorporated herein by reference in their entirety, are preferable examples of the titanocene-based radical initiator. They may be employed singly or in combinations of two or more. Of these, the titanocene of preference is bis($\eta$-5-2,4-cyclopentadiene-1-yl)bis[2,6-difluoro-3-(1H-pyrrole-1-yl)]phenyltitanium. A sensitizing dye, described further below, can also be employed as a sensitizing agent in a manner conforming to the wavelength of the light being radiated.

The content of the radical polymerization initiator in the holographic recording composition preferably falls within a range of 0.01 to 5 weight percent, more preferably a range of 1 to 3 weight percent.

Bifunctional or Greater Acrylate Monomer

The holographic recording composition of the present invention comprises a bifunctional or greater acrylate monomer (also referred to as a "polyfunctional acrylate", hereinafter). The above monomer can perform the role of recording material. Further, as set forth above, the use of a bifunctional or greater acrylate monomer as recording monomer in combination with the above-described amidine salt and titanocene-based radical polymerization initiator can reduce the amount of residual monomer to enhance archiving properties.

Bifunctional and trifunctional acrylates are preferable as the polyfunctional acrylate. Specific examples are: 1,6-hexanediol diacrylate, tripropyleneglycol diacrylate, neopentylglycol PO-modified diacrylate, 1,9-nonanediol diacrylate, hydroxypivalic acid neopentylglycol diacrylate, EO-modified bisphenol A diacrylate, polyethyleneglycol diacrylate, pentaerythritol triacrylate, pentaerythritol tetraacrylate, pentaerythritol hexaacrylate, EO-modified glycerol triacrylate, trimethylolpropane triacrylate, EO-modified trimethylolpropane triacrylate, and bisphenoxyethanolfluorene diacrylate. As needed, these may be employed in combination with other polyfunctional acrylates. Of these, bisphenoxyethanolfluorene diacrylate is preferred.

The content of the bifunctional or greater acrylate monomer in the holographic recording composition is not specifically limited and can be suitably selected based on the objective. A content falling within a range of 1 to 50 weight percent is preferable, a range of 1 to 30 weight percent is preferred, and a range of 3 to 10 weight percent is of even greater preference. A stable interference image can be obtained when the content is equal to or less than 50 weight percent, and performance that is desirable from the viewpoint of diffraction efficiency can be achieved at equal to or greater than 1 weight percent.

Other Components

Polymerization inhibitors and oxidation inhibitors may be added to the holographic recording composition of the present invention to improve the storage stability of the holographic recording composition, as needed.

Examples of polymerization inhibitors and oxidation inhibitors are: hydroquinone, p-benzoquinone, hydroquinone monomethyl ether, 2,6-ditert-butyl-p-cresol, 2,2'-methylenebis(4-methyl-6-tert-butylphenol), triphenylphosphite, trisnonylphenylphoshite, phenothiazine, and N-isopropyl-N'-phenyl-p-phenylenediamine.

The quantity of polymerization inhibitor or oxidation inhibitor added is preferably equal to or less than 3 weight percent of the total quantity of radical polymerizable monomer. When the quantity added exceeds 3 weight percent, polymerization may slow down, and in extreme cases, ceases.

As needed, a sensitizing dye may be added to the holographicl recording composition of the present invention. Known compounds such as those described in "Research Disclosure, Vol. 200, 1980, December, Item 20036" and "Sensitizers" (pp. 160-163, Kodansha, ed. by K. Tokumaru and M. Okawara, 1987) and the like may be employed as sensitizing dyes.

Specific examples of sensitizing dyes are: 3-ketocoumarin compounds described in Japanese Unexamined Patent Publication (KOKAI) Showa No. 58-15603; thiopyrilium salt described in Japanese Unexamined Patent Publication (KOKAI) Showa No. 58-40302; naphthothiazole merocyanine compounds described in Japanese Examined Patent Publications (KOKOKU) Showa Nos. 59-28328 and 60-53300; and merocyanine compounds described in Japanese Examined Patent Publications (KOKOKU) Showa Nos. 61-9621 and 62-3842 and Japanese Unexamined Patent Publications (KOKAI) Showa Nos. 59-89303 and 60-60104, which are expressly incorporated herein by reference in their entirety.

Further examples are the dyes described in "The Chemistry of Functional Dyes" (1981, CMC Press, pp. 393-416) and "Coloring Materials" (60 [4] 212-224 (1987)), which are expressly incorporated herein by reference in their entirety. Specific examples are cationic methine dyes, cationic carbonium dyes, cationic quinoneimine dyes, cationic indoline dyes, and cationic styryl dyes.

Further, keto dyes such as coumarin (including ketocoumarin and sulfonocoumarin) dyes, merostyryl dyes, oxonol dyes, and hemioxonol dyes; nonketo dyes such as nonketo polymethine dyes, triarylmethane dyes, xanthene dyes, anthracene dyes, rhodamine dyes, acrylidine dyes, aniline dyes, and azo dyes; nonketo polymethine dyes such as azomethine dyes, cyanine dyes, carbocyanine dyes, dicarbocyanine dyes, tricarbocyanine dyes, hemicyanine dyes, and styryl dyes; and quinone imine dyes such as azine dyes, oxazine dyes, thiazine dyes, quinoline dyes, and thiazole dyes are included among the spectral sensitizing dyes.

These sensitizing dyes may be employed singly or in combinations of two or more.

As needed, the holographic recording composition of the present invention may comprise a component that can diffuse into the inverse direction with that of the polymerizable components in order to reduce the volume change at polymerization, or a compound having an acid cleavage configuration may be added to the holographic recording composition in addition to the polymers.

The holographic recording composition of the present invention can be employed as various holographic recording compositions capable of recording information when irradiated with a light containing information. In particular, it is suited to use as a volume holographic recording composition.

The recording layer can be formed by casting when the viscosity of the optical recording composition is adequately low. When the viscosity is so high that casting is difficult, a dispenser can be employed to spread a recording layer on a lower substrate, and an upper substrate pressed onto the recording layer so as to cover it and spread it over the entire surface, thereby forming a recording medium.

Holographic Recording Medium

The holographic recording medium of the present invention comprises a recording layer formed with the holographic recording composition of the present invention. For example, the recording layer comprised of the optical recording composition of the present invention can be formed by the above-described method.

The holographic recording medium of the present invention comprises the above recording layer (holographic recording layer), and preferably comprises a lower substrate, a filter layer, a holographic recording layer, and an upper substrate. As needed, it may comprise additional layers such as a reflective layer, filter layer, first gap layer, and second gap layer.

The holographic recording medium of the present invention is capable of recording and reproducing information through utilization of the principle of the hologram. This may be a relatively thin planar hologram that records two-dimensional information or the like, or a volumetric hologram that records large quantities of information, such as three-dimensional images. It may be either of the transmitting or reflecting type. Since the holographic recording medium of the present invention is capable of recording high volumes of information, it is suitable for use as a volume holographic recording medium of which high recording density is demanded.

The method of recording a hologram on the holographic recording medium of the present invention is not specifically limited; examples are amplitude holograms, phase holograms, blazed holograms, and complex amplitude holograms. Among these, a preferred method is the so-called "collinear method" in which recording of information in volume holographic recording regions is carried out by irradiating an informing light and a reference light onto a volume holographic recording area as coaxial beams to record information by means of interference pattern through interference of the informing light and the reference light.

Details of substrates and various layers that can be incorporated into the holographic recording medium of the present invention will be described below.

—Substrate—

The substrate is not specifically limited in terms of its shape, structure, size, or the like; these may be suitably selected based on the objective. For example, the substrate may be disk-shaped, card-shaped, or the like. A substrate of a material capable of ensuring the mechanical strength of the holographic recording medium can be suitably selected. When the light employed for recording and reproducing enters after passing through the substrate, a substrate that is adequately transparent at the wavelength region of the light employed is desirable.

Normally, glass, ceramic, resin, or the like is employed as the substrate material. From the perspectives of moldability and cost, resin is particularly suitable. Examples of such resins are: polycarbonate resin, acrylic resin, epoxy resin, polystyrene resin, acrylonitrile—styrene copolymers, polyethylene resin, polypropylene resin, silicone resin, fluorine resin, ABS resin, and urethane resin. Of these, from the perspective of moldability, optical characteristics, and cost, polycarbonate resin and acrylic resin are preferred. Synthesized resins and commercially available resins may both be employed as substrates.

Normally, address servo areas are provided on the substrate at prescribed angular intervals as multiple positioning areas extending linearly in a radial direction, with the fan-shaped intervals between adjacent address servo areas serving as data areas. Information for operating focus servos and tracking servos by the sampled servo method, as well as address information, is recorded (preformatted) as pre-embossed pits (servo pits) or the like in address servo areas. Focus servo operation can be conducted using the reflective surface of a reflective film. Wobble pits, for example, can be employed as information for operating a tracking servo. When the holographic recording medium is card-shaped, it is possible not to have a servo pit pattern.

The thickness of the substrate is not specifically limited, and may be suitably selected based on the objective: a thickness of 0.1 to 5 mm is preferable, with 0.3 to 2 mm being preferred. A substrate thickness of equal to or greater than 0.1 mm is capable of preventing shape deformation during disk storage, while a thickness of equal to or less than 5 mm can avoid an overall disk weight generating an excessive load on the drive motor.

—Recording Layer—

The recording layer can be formed with the holographic recording composition of the present invention and is capable of recording information by holography. The thickness of the recording layer is not specifically limited, and may be suitably selected based on the objective. A recording layer thickness falling within a range of 1 to 1,000 micrometers yields an adequate S/N ratio even when conducting 10 to 300 shift multiplexing, and a thickness falling within a range of 100 to 700 micrometers is advantageous in that it yields a markedly good S/N ratio.

—Reflective Film—

A reflective film can be formed on the servo pit pattern surface of the substrate.

A material having high reflectance for the informing light and reference light is preferably employed as the material of the reflective film. When the wavelength of the light employed as the informing light and reference light ranges from 400 to 780 nm, examples of desirable materials are Al, Al alloys, Ag, and Ag alloys. When the wavelength of the light employed as the informing light and reference light is equal to or greater than 650 nm, examples of desirable materials are Al, Al alloys, Ag, Ag alloys, Au, Cu alloys, and TiN.

By employing an optical recording medium that reflects light as well as can be recorded and/or erased information such as a DVD (digital video disk) as a reflective film, it is possible to record and rewrite directory information, such as the areas in which holograms have been recorded, when rewriting was conducted, and the areas in which errors are present and for which alternate processing has been conducted, without affecting the hologram.

The method of forming the reflective film is not specifically limited and may be suitably selected based on the objective. Various vapor phase growth methods such as vacuum deposition, sputtering, plasma CVD, optical CVD, ion plating, and electron beam vapor deposition may be employed. Of these, sputtering is superior from the perspectives of mass production, film quality, and the like.

The thickness of the reflective film is preferably equal to or greater than 50 nm, more preferably equal to or greater than 100 nm, to obtain adequate reflectance.

—Filter Layer—

A filter layer can be provided on the servo pits of the substrate, on the reflective layer, or on the first gap layer, described further below.

The filter layer has a function of reflecting selective wavelengths in which, among multiple light rays, only light of a specific wavelength is selectively reflected, permitting passing one light and reflecting a second light. It also has a function of preventing generation of noise in which irregular reflection of the informing light and the reference light by the reflective film of the recording medium is prevented without a shift in the selectively reflected wavelength even when the angle of incidence varies. Therefore, by stacking filter layers on the recording medium, it is possible to perform optical recording with high resolution and good diffraction efficiency.

The filter layer is not specifically limited and may be suitably selected based on the objective. For example, the filter layer can be comprised of a laminate in which at least one of a dichroic mirror layer, coloring material-containing layer, dielectric vapor deposition layer, single-layer or two- or more layer cholesteric layer and other layers suitably selected as needed is laminated. The thickness of the filter layer is not specifically limited and may be, for example, about 0.5 to 20 micrometers.

The filter layer may be laminated by direct application on the substrate or the like with the recording layer, or may be laminated on a base material such as a film to prepare a filter layer which is then laminated on the substrate.

—First Gap Layer—

The first gap layer is formed as needed between the filter layer and the reflective film to flatten the surface of the lower substrate. It is also effective for adjusting the size of the hologram that is formed in the recording layer. That is, since the recording layer should form a certain size of the interference region of the recording-use reference light and the informing light, it is effective to provide a gap between the recording layer and the servo pit pattern.

For example, the first gap layer can be formed by applying a material such as an ultraviolet radiation-curing resin from above the servo pit pattern and curing it. When employing a filter layer formed by application on a transparent base material, the transparent base material can serve as the first gap layer.

The thickness of the first gap layer is not specifically limited, and can be suitably selected based on the objective. A thickness of 1 to 200 micrometers is desirable.

—Second Gap Layer—

The second gap layer is provided as needed between the recording layer and the filter layer.

The material of the second gap layer is not specifically limited, and may be suitably selected based on the objective. Examples are: transparent resin films such as triacetyl cellulose (TAC), polycarbonate (PC), polyethylene terephthalate (PET), polystyrene (PS), polysulfone (PSF), polyvinylalcohol (PVA), and poly(methyl methacrylate) (PMMA); and norbornene resin films such as a product called ARTON film made by JSR Corporation and a product called Zeonoa made by Japan Zeon Co. Of these, those that are highly isotropic are desirable, with TAC, PC, the product called ARTON, and the product called Zeonoa being preferred.

The thickness of the second gap layer is not specifically limited and may be suitably selected based on the objective. A thickness of 1 to 200 micrometers is desirable.

Specific embodiments of the holographic recording medium of the present invention will be described in greater detail below. However, the present invention is not limited to these specific embodiments.

First Implementation Embodiment

FIG. 1 is a schematic cross-sectional view of the configuration of the holographic recording medium according to the first implementation embodiment. In holographic recording medium 21 according to the first implementation embodiment, a servo pit pattern 3 is formed on substrate 1 made of polycarbonate resin or glass, and aluminum, gold, platinum, or the like is coated on servo pit pattern 3 to provide reflective film 2. In FIG. 1, servo pit pattern 3 has been formed over the entire surface of lower substrate 1, but the servo pit pattern may be formed cyclically. Servo pit pattern 3 is normally 1,750 Angstroms (175 nm) in height, and is quite small relative to the thickness of the substrate and the other layers.

First gap layer 8 is formed by spin coating or the like a material such as an ultraviolet radiation-curing resin on reflective film 2 of lower substrate 1. First gap layer 8 is effective for both the protection of reflective layer 2 and the adjustment of the size of the hologram formed in recording layer 4. That is, providing a gap between recording layer 4 and servo pit pattern 3 is effective for the formation of an interference area for the recording-use reference light and informing light of a certain size in recording layer 4.

Filter layer 6 is provided on first gap layer 8. Recording layer 4 is sandwiched between filter layer 6 and upper substrate 5 (a polycarbonate resin substrate or glass substrate) to form holographic recording medium 21.

FIG. 1 shows a filter layer 6 that passes only infrared radiation and blocks light of all other colors. Accordingly, since the informing light and recording and reproducing-use reference light are blue, they are blocked by filter layer 6 and do not reach reflective film 2. They return, exiting from entry and exit surface A.

Filter layer 6 is a multilayered vapor deposition film comprised of high refractive index layers and low refractive index layers deposited in alternating fashion.

Filter layer 6, comprised of a multilayered vapor deposition film, may be formed directly on first gap layer 8 by vacuum vapor deposition, or a film comprised of a multilayered vapor deposition film formed on a base material may be punched into the shape of a holographic recording medium to employed as filter layer 6.

In this embodiment, holographic recording medium 21 may be disk-shaped or card-shaped. When card-shaped, the servo pit pattern may be absent. In holographic recording medium 21, the lower substrate is 0.6 mm, first gap layer 8 is 100 micrometers, filter layer 6 is 2 to 3 micrometers, recording layer 4 is 0.6 mm, and upper substrate 5 is 0.6 mm in thickness, for a total thickness of about 1.9 mm.

Figure 3:
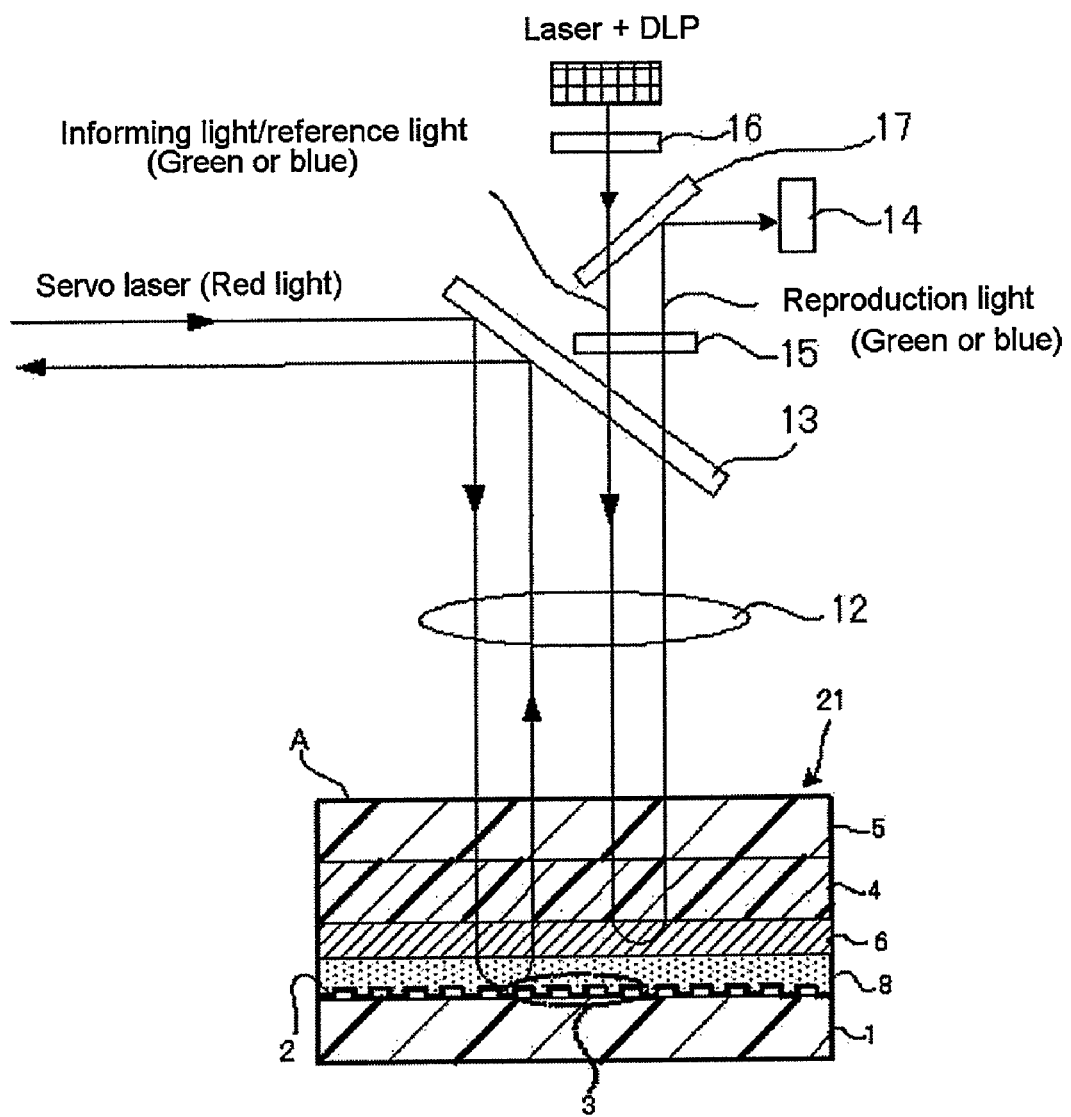
FIG. 3 is a drawing descriptive of an example of an optical system permitting recording and reproducing of information on a holographic recording medium.

An optical system applicable for the recording of information on and the reproduction of information from holographic recording medium 21 will be described with reference to FIG. 3.

First, a light (red light) emitted by a servo laser is nearly 100 percent reflected by dichroic mirror 13, passing through objective lens 12. Objective lens 12 directs the servo light onto holographic recording medium 21 so that it focuses at a point on reflective film 2. That is, dichroic mirror 13 passes light of green and blue wavelengths while reflecting nearly 100 percent of red light. The servo light entering entry and exit surface A to which and from which the light enters and exits of holographic recording medium 21 passes through upper substrate 5, recording layer 4, filter layer 6, and first gap layer 8, is reflected by reflective layer 2, and passes back through first gap layer 8, filter layer 6, recording layer 4, and upper substrate 5, exiting entry and exit surface A. The returning light that exits passes through objective lens 12, is nearly 100 percent reflected by dichroic mirror 13, and the servo information is detected by a servo information detector (not shown in FIG. 3). The servo information that is detected is employed for focus servo, tracking servo, slide servo, and the like. When the hologram material included in recording layer 4 is not sensitive to red light, the servo light passes through recording layer 4 without affecting recording layer 4, even when the servo light is randomly reflected by reflective film 2. Since the light in the form of the servo light reflected by reflective film 2 is nearly 100 percent reflected by dichroic mirror 13, the servo light is not detected by a CMOS sensor or CCD 14 for reproduction image detection and thus does not constitute noise to the reproduction light.

The informing light and recording-use reference light generated by the recording/reproducing laser passes through polarizing plate 16 and is linearly polarized. It then passes through half mirror 17, becoming circularly polarized light at the point where it passes through ¼ wavelength plate 15. The light then passes through dichroic mirror 13, and is directed by objective lens 12 onto holographic recording medium 21 so that the informing light and recording-use reference light form an interference pattern in recording layer 4. The informing light and recording-use reference light enter through entry and exit surface A, interfering with each other to form an interference pattern in recording layer 4. Subsequently, the informing light and recording-use reference light pass through recording layer 4, entering filter layer 6. However, they are reflected before reaching the bottom surface of filter layer 6, returning. That is, neither the informing light nor the recording-use reference light reaches reflective film 2. That is because filter layer 6 is a multilayered vapor deposition layer in which multiple high refractive index and low refractive index layers are alternatively laminated, and has the property of passing only red light.

Second Implementation Embodiment

Figure 2:
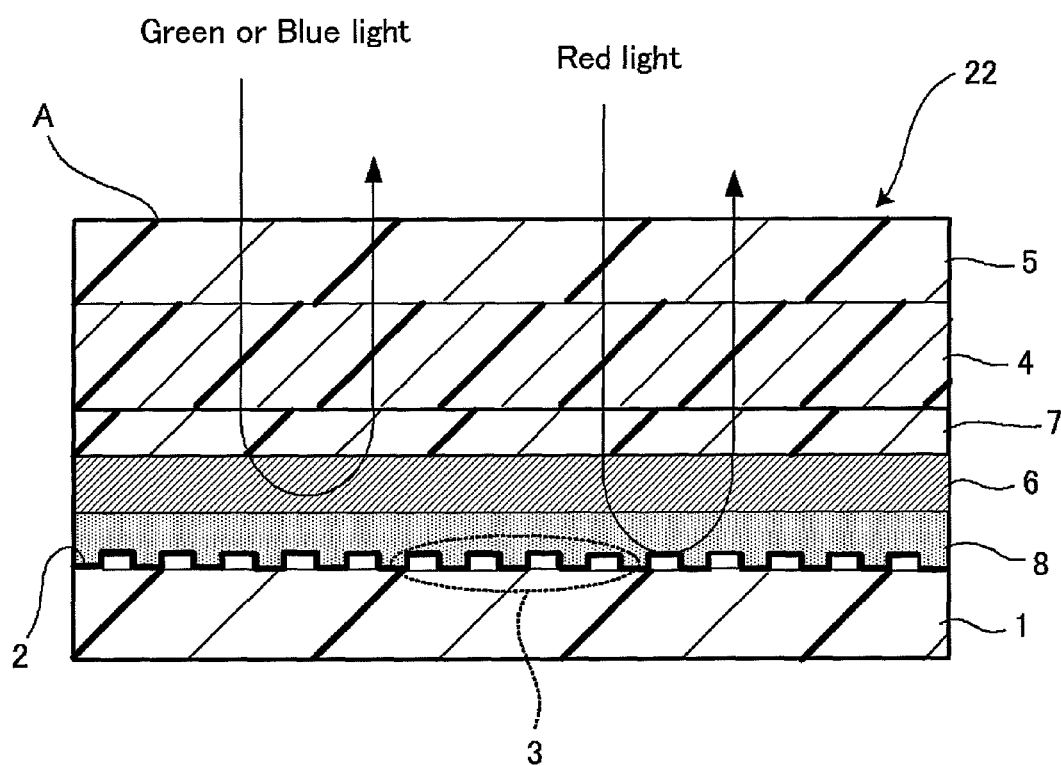
FIG. 2 is a schematic cross-sectional view of an example of a holographic recording medium according to a second implementation embodiment.

FIG. 2 is a schematic cross-sectional view of the configuration of the holographic recording medium according to the second implementation embodiment. A servo pit pattern 3 is formed on substrate 1 made of polycarbonate resin or glass in the holographic recording medium 22 according to the second implementation embodiment. Reflective film 2 is provided by coating aluminum, gold, platinum, or the like on the surface of servo pit pattern 3. Servo pit pattern 3 is normally 1,750 Angstroms (175 μm) in height in the same manner as in the first implementation embodiment.

The configuration of the second implementation embodiment differs from that of the first implementation embodiment in that second gap layer 7 is provided between filter layer 6 and recording layer 4 in holographic recording medium 22 according to the second implementation embodiment. A point at which the informing light and reproduction light are focused is present in second gap layer 7. When this area is embedded in a photopolymer, excessive consumption of monomer occurs due to excess exposure, and multiplexing recording capability diminishes. Accordingly, it is effective to provide a nonreactive transparent second gap layer.

Filter layer 6 in the form of a multilayered vapor deposition film comprised of multiple layers in which multiple high refractive index and low refractive index layers are alternately laminated is formed over first gap layer 8 once first gap layer 8 has been formed, and the same one as employed in the first implementation embodiment can be employed as filter layer 6 in the second implementation embodiment.

In holographic recording medium 22 of the second implementation embodiment, lower substrate 1 is 1.0 mm, first gap 8 is 100 micrometers, filter layer 6 is 3 to 5 micrometers, second gap layer 7 is 70 micrometers, recording layer 4 is 0.6 mm, and upper substrate 5 is 0.4 mm in thickness, for a total thickness of about 2.2 mm.

When recording or reproducing information, a red servo light and a green informing light and recording/reproducing reference light are directed onto holographic recording medium 22 of the second implementation embodiment having the configuration set forth above. The servo light enters through entry and exit surface A, passing through recording layer 4, second gap layer 7, filter layer 6, and first gap layer 8, and is reflected by reflective film 2, returning. The returning light then passes sequentially back through first gap layer 8, filter layer 6, second gap layer 7, recording layer 4, and upper substrate 5, exiting through entry and exit surface A. The returning light that exits is used for focus servo, tracking servo, and the like. When the hologram material included in recording layer 4 is not sensitive to red light, the servo light passes through recording layer 4 and is randomly reflected by reflective film 2 without affecting recording layer 4. The green informing light and the like enters through entry and exit surface A, passing through recording layer 4 and second gap layer 7, and is reflected by filter layer 6, returning. The returning light then passes sequentially back through second gap layer 7, recording layer 4, and upper substrate 5, exiting through entry and exit layer A. During reproduction, as well, the reproduction-use reference light and the reproduction light generated by irradiating the reproduction-use reference light onto recording layer 4 exit through entry and exit surface A without reaching reflective film 2. The optical action around holographic recording medium 22 (objective lens 12, filter layer 6, and detectors in the form of CMOS sensors or CCD 14 in FIG. 3) is identical to that in the first implementation embodiment and thus the description thereof is omitted.

The method of recording information on the holographic recording medium of the present invention will be described below.

An interference image can be formed on the recording layer formed with the holographic recording composition of the present invention by irradiation of an informing light and a reference light to the recording layer, and a fixing light can be irradiated to the recording layer on which the interference image has been formed to fix the interference image.

A light having coherent properties can be employed as the informing light. By irradiating the informing light and reference light onto the recording medium so that the optical axes of the informing light and reference light are coaxial, it is possible to record in the recording layer an interference image generated by interference of the informing light and reference light. Specifically, a informing light imparted with a two dimensional intensity distribution and a reference light of intensity nearly identical to that of the informing light are superposed in the recording layer and the interference pattern that they form is used to generate an optical characteristic distribution in the recording layer, thereby recording information. The wavelengths of the informing light and reference light are preferably equal to or greater than 400 nm, more preferably 400 to 2,000 nm, and further preferably, 400 to 700 nm.

After recording information (forming an interference image) by irradiating the informing light and reference light, a fixing light can be irradiated to fix the interference image. The wavelength of the fixing light is preferably less than 400 nm, more preferably equal to or greater than 100 nm but less than 400 nm, and further preferably, equal to or greater than 200 μm but less than 400 nm.

Information can be reproduced by irradiating a reference light onto an interference image formed by the above-described method. In the course of reading (reproducing) information that has been written, just a reference light is irradiated onto the recording layer with the same arrangement as during recording, causing a reproduction light having an intensity distribution corresponding to the optical characteristic distribution formed in the recording layer to exit the recording layer.

An optical recording and reproducing device suited to use in the recording and reproducing of information in the holographic recording medium of the present invention will be described with reference to FIG. 4.

Figure 4:
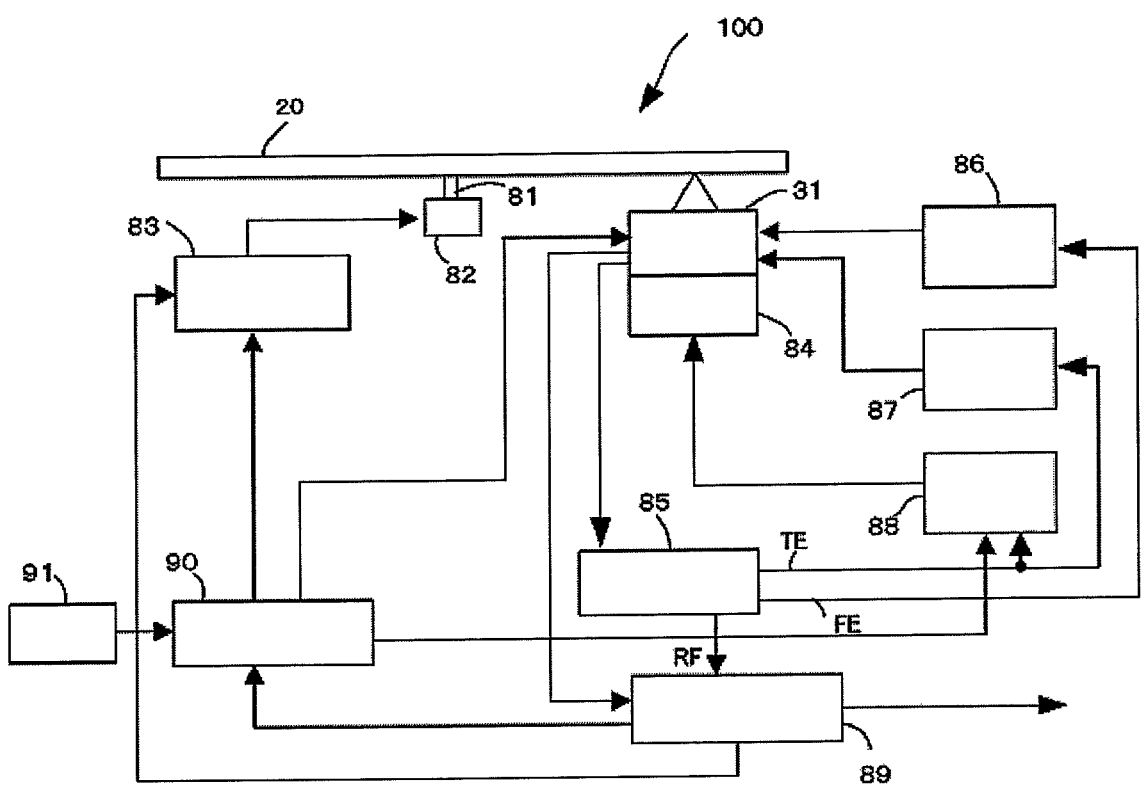
FIG. 4 is a block diagram showing an example of the overall configuration of a recording and reproducing device suited to use in recording and reproducing information on the holographic recording medium of the present invention.

The optical recording and reproducing device 100 of FIG. 4 is equipped with spindle 81 on which is mounted holographic recording medium 20, spindle motor 82 rotating spindle 81, and spindle servo circuit 83 controlling spindle motor 82 so that it maintains holographic recording medium 20 at a prescribed rpm level.

Recording and reproducing device 100 is further equipped with pickup 31 for recording information by irradiating a informing light and a recording-use reference light onto holographic recording medium 20, and for reproducing information that has been recorded on holographic recording medium 20 by irradiating a reproducing-use reference light onto holographic recording medium 20 and detecting the reproduction light; and driving device 84 capable of moving pickup 31 radially with respect to holographic recording medium 20.

Optical recording and reproducing device 100 is equipped with detection circuit 85 for detecting focus error signal FE, tracking error signal TE, and reproduction signal RF based on the output signals of pickup 31; focus servo circuit 86 that operates a focus servo by driving an actuator in pickup 31 to move an objective lens (not shown in FIG. 4) in the direction of thickness of holographic recording medium 20 based on focus error signal FE detected by detection circuit 85; tracking servo circuit 87 that operates a tracking servo by driving an actuator in pickup 31 to move an objective lens in the radial direction of holographic recording medium 20 based on tracking error signal TE detected by detection circuit 85; and slide servo circuit 88 that operates a slide servo by controlling drive device 84 to move pickup 31 in the radial direction of holographic recording medium 20 based on instructions from a controller, described further below, and tracking error signal TE.

Optical recording and reproducing device 100 is further equipped with signal processing circuit 89 that decodes the output data of a CCD array or CMOS in pickup 31 to reproduce data recorded in the data areas of holographic recording medium 20, reproduces a base clock based on reproduction signal RF from detection circuit 85, and determines addresses; controller 90 that effects overall control of optical recording and reproducing device 100; and operation element 91 providing various instructions to controller 90. Controller 90 inputs the base clock and address information outputted by signal processing circuit 89 and controls pickup 31, spindle servo circuit 83, slide servo circuit 88, and the like. Spindle servo circuit 83 inputs the base clock that is outputted by signal processing circuit 89. Controller 90 comprises a central processing unit (CPU), read only memory (ROM), and random access memory (RAM). The functions of controller 90 can be realized by having the CPU that employs the RAM as a work area and execute programs stored in the ROM.

EXAMPLES

The present invention will be described in detail below based on examples. However, the present invention is not limited to the examples.

Example 1

Preparation of Holographic Recording Composition

To hexamethylene diisocyanate (1.547 g) (made by Tokyo Chemical Industry Co., Ltd.) was added bis(η-5-2,4-cyclopentadiene-1-yl)bis[2,6-difluoro-3-(1H-pyrrole-1-yl)]phenyltitanium (Irg-784 made by Chiba Specialty Chemicals) (65 mg) and the mixture was dissolved in bisphenoxyethanolfluorene diacrylate (0.451 g) (made by Osaka Gas Chemical Co., Ltd.). To this was then added 1.8 diazabicyclo(5.4.0) undeceneoctanoic acid complex (34 mg) (U-CAT SA 102 made by San-Apro Limited). To the mixture were added polypropylene oxide triol (Actocol MN-300 made by Mitsui Takeda Polyurethane, Inc.) (1.275 g) (Compound 1) and PEG-400 (Tokyo Chemical Industry Co., Ltd.) (1.130 g) (Compound 2). The mixture was then stirred for 10 minutes, yielding a holographic recording composition.

Example 2

Preparation of Holographic Recording Composition

A holographic recording composition was obtained in the same manner as in Example 1, with the exceptions that the quantity of hexamethylene diisocyanate (made by Tokyo Chemical Industry Co., Ltd.) added was changed to 1.565 g, the quantity of Actocol MN-300 (made by Mitsui Takeda Polyurethane, Inc.) added was changed to 1.336 g, and the quantity of PEG-400 (Tokyo Chemical Industry Co., Ltd.) added was changed to 1.051 g.

Example 3

Preparation of Holographic Recording Composition

A holographic recording composition was obtained in the same manner as in Example 1 with the exception that the U-CAT SA 102 (made by San-Apro Limited) was replaced with 1.5-diazabicyclo(4.3.0) noneneoctylic acid complex (U-CAT1102 made by San-Apro Limited).

Comparative Example 1

Preparation of Holographic Recording Composition

A holographic recording composition was obtained in the same manner as in Example 1 with the exception that the U-CAT SA 102 (made by San-Apro Limited) was replaced with diisopropylethylamine (made by Tokyo Chemical Industry Co., Ltd.).

Comparative Example 2

Preparation of Holographic Recording Composition

Under a nitrogen gas flow were mixed 31.5 g of biscyclohexylmethane diisocyanate (made by Tokyo Chemical Industry Co., Ltd.), 61.2 g of polypropylene oxide triol (made by Tokyo Chemical Industry Co., Ltd.), 2.5 g of tetramethyleneglycol (made by Tokyo Chemical Industry Co., Ltd.), 3.1 g of monomer in the form of 2,4,6-tribromophenyl acrylate (made by Osaka Gas Chemical Co., Ltd.), 0.69 g of photopolymerization initiator (Irgacure 784, made by Chiba Specialty Chemicals), and 1.01 g of dibutyl tin laurate to prepare a holographic recording composition.

Examples 4 to 6, Comparative Examples 3 and 4

Preparation of Holographic Recording Medium

A first substrate was prepared by subjecting one side of a glass sheet 0.5 mm in thickness to an antireflective treatment to impart a reflectance of 0.1 percent for perpendicularly incident light with the wavelength of 532 nm.

A second substrate was prepared by subjecting one side of a glass sheet 0.5 mm in thickness to an aluminum vapor deposition treatment to impart a reflectance of 90 percent for perpendicularly incident light with the wavelength of 532 nm.

A transparent polyethylene terephthalate sheet 500 micrometers in thickness was provided as a spacer on the side of the first substrate that had not been subjected to the antireflective treatment.

The holographic recording compositions of Examples 1 to 3 and Comparative Examples 1 and 2 were each separately placed on first substrates, the aluminum vapor deposited surface of the second substrates were stacked on the holographic recording composition in such a manner that air was not entrained, and the first and second substrates were bonded through the spacer. The holographic recording layer was left standing for 6 hours at 80° C. to prepare the holographic recording media of Examples 1 to 3 and Comparative Examples 3 and 4. The holographic recording layer formed was 200 micrometers in thickness.

<Recording in the Holographic Recording Medium and Evaluation>

Employing a collinear hologram recording and reproducing tester (SHOT-1000, made by Pulsetec Industrial Co., Ltd.), a series of multiplexed holograms was written into the various holographic recording media that had been prepared at a spot recording diameter of 200 micrometers at the focal position of the recording hologram, and the sensitivity (recording energy) and level of multiplexing were measured and evaluated as follows. The results are given in Table 4.

—Sensitivity Measurement—

The beam energy during recording (mJ/cm$^2$) was varied and the change in error rate of the reproduced signal (BER: bit error rate) was measured. Normally, there is such a tendency that the luminance of the reproduced signal increases and the BER of the reproduced signal gradually drops with an increase in the irradiated light energy. In the measurement, the lowest light energy at which a fairly good reproduced image (BER<$10^{-4}$) was obtained was adopted as the recording sensitivity of the holographic recording medium.

—Fixing Test—

The quantity of residual monomer was measured by irradiating 532 nm light to a cumulative quantity of light of 4,000 mJ/cm$^2$, extracting the sample with THF (made by Tokyo Chemical Industry Co., Ltd.), and conducting analysis with HPLC (Shimadzu, Ltd.). In fixing, it was desirable for all of the monomer to be consumed.

—Archiving Property Test—

The holographic recording compositions of Examples 1 to 3 and Comparative Examples 1 and 2 were sandwiched between two glass sheets on which had been applied a 0.2 mm Teflon spacer, and heat cured. The transmitting-type samples were subjected to hologram exposure with two beams 6 mm in diameter to achieve a diffraction efficiency of about 70 to 80 percent. The initial diffraction efficiency was denoted as $\eta_0$ and the diffraction efficiency measured after a forcing test in a high temperature vat at 85° C. for 72 hours was denoted as $\eta_{72}$. The following calculation was then performed to obtain a measure of the archiving property:

Recording maintainability $H = \eta_{72}/\eta_0 \times 100$

TABLE 4

| | Holographic recording composition | Additive | Polyfunctional alcohol | Functional number of radical polymerizable monomer | Crosslinking point density (mmole/g) |
|---|---|---|---|---|---|
| Example 4 | Example 1 | Amidine salt denoted by General Formula (1) | Compounds 1 and 2 | Bifunctional | 1.06 |
| Example 5 | Example 2 | | Compounds 1 and 2 | Bifunctional | 1.11 |
| Example 6 | Example 3 | | Compounds 1 and 2 | Bifunctional | 1.06 |
| Comp. Ex. 3 | Comp. Ex. 1 | Amine | Compounds 1 and 2 | Bifunctional | 1.06 |
| Comp. Ex. 4 | Comp. Ex. 2 | Tin | — | Monofunctional | — |

| | Sensitivity $\mu ON = 200$ (mJ/cm$^2$) | Fixing property Residual monomer amount (%) | Archiving property Retention of diffraction efficiency |
|---|---|---|---|
| Example 4 | 0.4 | 6.2 | 98 |
| Example 5 | 0.3 | 5.4 | 96 |
| Example 6 | 0.5 | 6.1 | 95 |
| Comp. Ex. 3 | 10.0 | 64.2 | 98 |
| Comp. Ex. 4 | 80.0 | 55.3 | 48 |

As shown in Table 4, high-sensitivity recording was possible in the holographic recording media of Examples 4 to 6, which had recording layers formed with the holographic recording compositions of Examples 1 to 3. Further, the holographic recording media of Examples 4 to 6 had little residual monomer and exhibited good archiving properties.

The holographic recording medium comprising a recording layer formed with the holographic recording composition of the present invention is capable of high density recording, and is thus suitable for use in various volume hologram-type optical recording media capable of high-density image recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

What is claimed is:

1. A holographic recording composition comprising a bifunctional or greater isocyanate, a mixture of polyfunctional alcohols comprising a bifunctional alcohol and a trifunctional or greater alcohol, a titanocene-based radical polymerization initiator, a bifunctional or greater acrylate monomer, and an amidine salt denoted by General Formula (1):

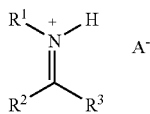

General Formula (1)

wherein $R^1$, $R^2$, and $R^3$ each independently denotes an alkyl group, aryl group, amino group, or acyl group, $R^1$ and $R^2$ may be bonded together to form a ring, $R^2$ and $R^3$ may be bonded together to form a ring, and $A^-$ denotes an anion selected from the group consisting of halogen anion, sulfonate anion, tetrafluoroborate anion, hexafluorophosphate anion, perchloric acid anion, and octanoic acid anion.

2. The holographic recording composition of claim 1, wherein the amidine salt is DBN octanoic acid salt.

3. The holographic recording composition of claim 1, wherein the bifunctional alcohol comprises polyethylene glycol.

4. The holographic recording composition of claim 1, wherein the bifunctional alcohol comprises polypropylene glycol.

5. The holographic recording composition of claim 1, wherein the trifunctional or greater alcohol comprises polypropylene oxide triol.

6. The holographic recording composition of claim 1, wherein a polyurethane matrix formed through a curing reaction between the bifunctional or greater isocyanate and the polyfunctional alcohol has a crosslinking point density ranging from 0.9 to 1.2 mmole/g.

7. A holographic recording medium comprising a recording layer, wherein the recording layer is formed with the holographic recording composition of claim 1.

* * * * *